B. W. BOWEN.
Washing-Machines.
No. 141,850.  Patented August 19, 1873.
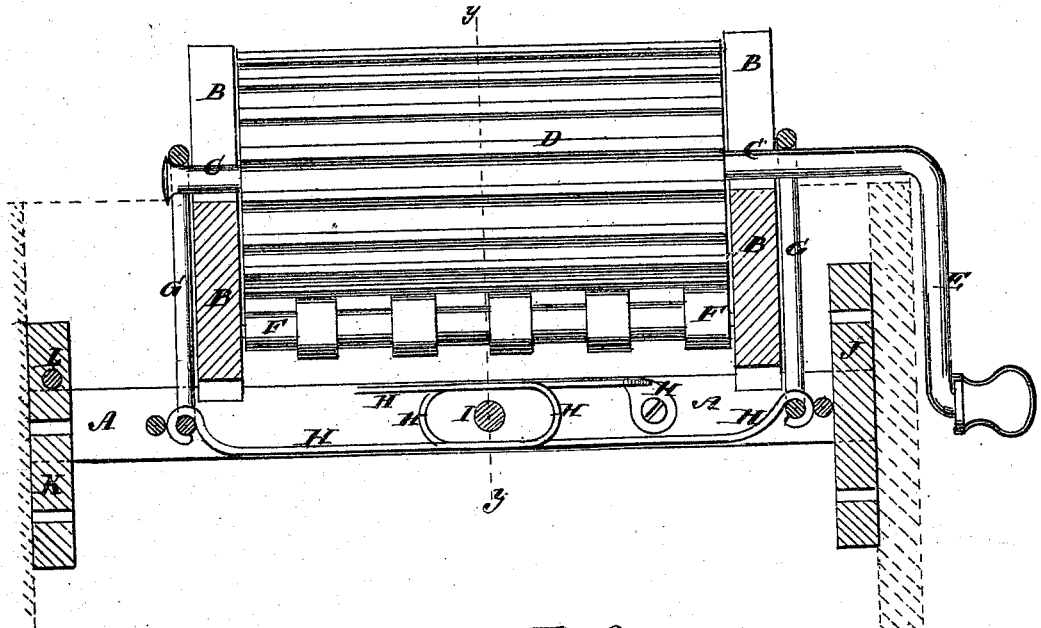
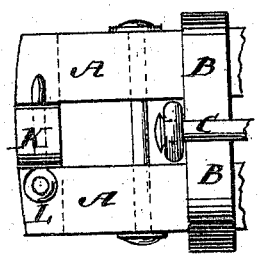
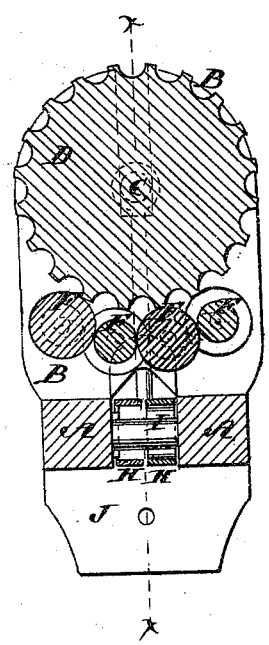
Witnesses:
E. Wolff
C. Sedgwick
Inventor:
B. W. Bowen
per Munn & Co
Attorneys.

UNITED STATES PATENT OFFICE.

BENJAMIN W. BOWEN, OF GREENVILLE, PENNSYLVANIA.

IMPROVEMENT IN WASHING-MACHINES.

Specification forming part of Letters Patent No. 141,850, dated August 19, 1873; application filed July 5, 1873.

*To all whom it may concern:*

Be it known that I, BENJAMIN W. BOWEN, of Greenville, in the county of Mercer and State of Pennsylvania, have invented a new and useful Improvement in Washing-Machine, of which the following is a specification:

Figure 1 is a detail vertical longitudinal section of my improved washing-machine taken through the line $x\,x$, Fig. 2. Fig. 2 is a detail vertical section of the same taken through the line $y\,y$, Fig. 1. Fig. 3 is a detail top view of one end of the machine.

Similar letters of reference indicate corresponding parts.

My invention has for its object to furnish an improved washing-machine, simple in construction, convenient in use, and effective in operation; and it consists in the construction and combination of the various parts of the machine, as hereinafter more fully described.

A are two cross-bars, which are made of such a length as to reach across the tub, and which are connected and held in their proper relative positions by bolts, and by being attached to the lower ends of the uprights B. The upper parts of the uprights B are slotted from their upper ends, to receive the journals of the shaft C, to which the roller D is attached, and upon one end of which is formed, or to it is attached, a crank, E, by which the machine is operated. The roller D is corrugated, grooved, or fluted longitudinally, as shown in Figs. 1 and 2. F are four small rollers, the journals of which revolve loosely in bearings in the lower part of the uprights B. The rollers F are arranged in an arc corresponding with the circumference of the roller D, as shown in Fig. 2, and have square ring-grooves formed in them, the grooves and the spaces between the grooves being made of equal width, so that the said rollers may interlock with each other, as shown in Fig. 2. G are two rods, upon the upper ends of which are formed hooks, to hook upon the projecting ends of the journals or shafts C. The lower ends of the rods G are pivoted to the ends of the longer arms of the U-shaped springs H, the ends of the other or shorter arms of which are secured to the inner sides of the bars A, and which are kept in place by the pin I, which passes through the bend of said springs H, and the ends of which are attached to the said bars A. J K are cleats or blocks, which are designed to be attached to the inner surface of the opposite sides of the tub in such positions as to allow the crank-shaft C to come close down to the edge of the tub, bringing the machine as low down in the tub as possible without notching the top edges of the said tub. In the cleats or blocks J are formed two holes or notches, to receive the ends of the bars A. Upon the upper end of the other block or cleat, K, is formed a tenon, to fit into the space between the ends of the bars A, where they are secured in place by a pin, L, passed through the said tenon above the said bars A, as shown in Figs. 1 and 3. The ends of the bars A farthest from the crank E are left long, so that they may be cut off to make the length of the said bars correspond with the diameter of the tub at the point where the cleats or blocks J K are attached.

In using the machine, the clothes to be washed are passed back and forth between the large fluted roller D and the small rollers F, the form of which is such that the clothes are alternately saturated and squeezed, and are thus thoroughly washed in a very short time.

Having thus described my invention, I claim as new and desire to secure by Letters Patent—

1. The U-shaped springs H, arranged in connection with the bars A and hook-rods G, substantially as herein shown and described, and for the purpose set forth.

2. The combination of the bars A, uprights B, shaft C, fluted roller D, crank E, small transversely-grooved rollers F, hook-bars G, and springs H with each other, substantially as herein shown and described, and for the purpose set forth.

BENJAMIN W. BOWEN.

Witnesses:
 DANIEL J. DILLON,
 EUGENE ROONEY.